(12) United States Patent
Hendrickson (10) Patent No.: US 8,940,239 B2
(45) Date of Patent: Jan. 27, 2015

(54) CATALYST FEED CONTROL DURING CATALYST TRANSITION PERIODS

(71) Applicant: Chevron Phillips Chemical Company LP, The Woodlands, TX (US)

(72) Inventor: Gregory G. Hendrickson, Kingwood, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

(21) Appl. No.: 14/465,525

(22) Filed: Aug. 21, 2014

(65) Prior Publication Data

US 2014/0363340 A1    Dec. 11, 2014

Related U.S. Application Data

(62) Division of application No. 13/100,675, filed on May 4, 2011, now Pat. No. 8,846,829.

(51) Int. Cl.
| | | |
|---|---|---|
| *B01J 8/18* | (2006.01) | |
| *B01J 19/18* | (2006.01) | |
| *G05B 7/00* | (2006.01) | |
| *B01J 8/00* | (2006.01) | |
| *C08F 2/34* | (2006.01) | |

(52) U.S. Cl.
CPC ........ *B01J 8/001* (2013.01); *B01J 2208/00725* (2013.01); *B01J 2208/00548* (2013.01)
USPC ........... 422/111; 422/119; 422/132; 700/269; 526/59

(58) Field of Classification Search
CPC ..... B01J 8/24; B01J 2219/00164; C08F 2/12; C08F 2/34; C08F 2400/02
USPC .............. 700/269; 422/111, 119, 132; 526/59
See application file for complete search history.

(56) References Cited

U.S. PATENT DOCUMENTS

| | | | |
|---|---|---|---|
| 3,257,363 A | 6/1966 | Miller et al. | |
| 3,998,995 A | 12/1976 | Buss et al. | |
| 4,421,523 A | 12/1983 | Mehta et al. | |
| 4,588,790 A | 5/1986 | Jenkins, III et al. | |

(Continued)

OTHER PUBLICATIONS

Lo et al., Dynamic Modeling of Polyethylene Grade Transitions in Fluidized Bed Reactors Employing Nikel-Diimine Catalysts, 45 Ind. Eng. Chem. Res., 993-1008 (2006).

(Continued)

*Primary Examiner* — Fred M Teskin
(74) *Attorney, Agent, or Firm* — Fletcher Yoder, P.C.

(57) ABSTRACT

Techniques are provided for operating a reactor during a catalyst transition period. The instantaneous reaction rate during a catalyst transition period can be determined using real-time measured process variables, and material balance calculations to provide an instantaneous reaction rate in approximately real time. According to certain embodiments, a material balance can be performed on the reactor system using a continuous ideal stirred tank reactor to determine the fractions of each type of catalyst that are present in the reactor, as well as the overall weight percent of catalyst in the reactor. A controller can then calculate the overall instantaneous reaction rate based on the respective catalyst fractions and the overall weight percent of catalyst in the reactor. The catalyst feed rate can then be adjusted based on the determined instantaneous reaction rate to maintain the instantaneous reaction rate within desired limits during a catalyst transition period.

20 Claims, 4 Drawing Sheets

(56) References Cited

U.S. PATENT DOCUMENTS

| | | |
|---|---|---|
| 4,628,034 A | 12/1986 | Hofferber |
| 6,723,804 B1 | 4/2004 | Battiste |
| 6,897,269 B2 | 5/2005 | Schreck et al. |
| 6,908,971 B2 | 6/2005 | Burns et al. |
| 7,417,095 B2 | 8/2008 | Battiste |
| 7,531,606 B2 | 5/2009 | Hendrickson |
| 7,598,327 B2 | 10/2009 | Shaw |
| 2004/0214969 A1 | 10/2004 | Ehrman et al. |
| 2010/0056707 A1 | 3/2010 | Hottovy et al. |

OTHER PUBLICATIONS

Ochs et al., Dynamic Flowsheet Modeling of Polymerization Processes Using Polyred, 20 Computers Chem. Engng No. 6/7, 657-663 (1996).

Zacca et al., Reactor Residence-Time Distribution Effects on the Multistage Polymerization of Olefins—II. Polymer Properties: Bimodal Polypropylene and Linear Low-Density Polythylene, 52 Chemical Engineering Science, No. 12, 1941-1967 (1997).

FIG. 4

CATALYST FEED CONTROL DURING CATALYST TRANSITION PERIODS

CROSS-REFERENCE TO RELATED APPLICATION

This application is a divisional of U.S. patent application Ser. No. 13/100,675, entitled "Catalyst Feed Control During Catalyst Transition Periods," filed on May, 4, 2011, which is incorporated by reference herein in its entirety.

BACKGROUND

The present disclosure relates generally to feed control of catalysts, and more particularly, to feed control of catalysts during catalyst transition periods.

This section is intended to introduce the reader to aspects of art that may be related to aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Catalysts can be employed to facilitate the formation of products through chemical reactions. It is often desirable to control and monitor the rate of chemical reactions to produce products with specific properties. For example, in polymerization reactions, the reaction rate can be controlled within specified limits to produce polymers with desired properties, such as a desired molecular weight and/or polymer chain size, among others. The reaction rate is typically affected by the amount of catalyst in the reactor, and therefore, the reaction rate can be controlled by varying the catalyst feed rate, as well as by controlling other reaction conditions.

During steady state operation, the catalyst inventory within a reactor remains fairly constant, and therefore, the overall instantaneous reaction rate, which also may remain relatively constant, can be approximated using measured process variables. For example, for polymerization reactions, the reactor catalyst inventory can be calculated by performing a laboratory test, such as an ash test to determine the fraction of catalyst in the product exiting the reactor. The fraction of catalyst in the product can be used along with the weight of solids in the reactor to calculate the reactor catalyst inventory. The calculated reactor catalyst inventory can then be used in conjunction with reaction rate constants and measured reactant concentrations to determine the reaction rate. In summary, measured variables typically can be used to determine the reaction rate during steady state operation of the reactor where the type of catalyst entering the reactor remains constant.

However, during reactor operations, there is often a need to transition from one type of catalyst to another, for example, to change over from producing one type of product to another. During catalyst transitions, process variables are continuously changing, and accordingly, it can be difficult to determine the instantaneous reaction rate. For example, during catalyst transitions, the reactor catalyst inventory and the instantaneous reaction rate can change rapidly. Accordingly, rapid adjustments may be desired to maintain the overall instantaneous reaction rate within desired limits. However, laboratory test results can take several hours to obtain, which results in lag time in the determination of the instantaneous reaction rate and the subsequent adjustment of the catalyst feed rate based on the determined instantaneous reaction rate. The lag time may cause the instantaneous reaction rate to exceed and/or fall below a desired range, which can result in product that does not meet desired product specifications (i.e., "off-spec" product). Further, an uncontrolled instantaneous reaction rate may impede reactor operations, for example, causing reactor fouling or plugging, and/or may result in slow catalyst transitions and increased catalyst waste.

BRIEF DESCRIPTION OF THE DRAWINGS

Advantages of the present disclosure may become apparent upon reading the following detailed description and upon reference to the drawings in which.

DETAILED DESCRIPTION OF SPECIFIC EMBODIMENTS

One or more specific embodiments of the present disclosure will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present disclosure is directed to techniques for operating a reactor during a catalyst transition period. More specifically, the present disclosure is directed to techniques for determining the overall instantaneous reaction rate during a catalyst transition period. As used herein the term "overall instantaneous reaction rate" refers to the instantaneous rate of reaction based on all of the catalyst in the reactor, which, during catalyst transition periods, includes the both the original type of catalyst and the new type of catalyst. The instantaneous reaction rate can be determined using real-time measured process variables, material balances, and calculations to provide an instantaneous reaction rate in approximately real time (e.g., such as within approximately 1 to 120 seconds, and all subranges therebetween) and/or without significant delay. The catalyst feed rate can then be adjusted based on the determined instantaneous reaction rate to maintain the instantaneous reaction rate within desired limits during a catalyst transition period. The present techniques facilitate responsive adjustment of the catalyst feed rate, which provides greater control in maintaining the instantaneous reaction rate within the desired limits. By maintaining the instantaneous reaction rate within the desired limits, off-spec product can be minimized during catalyst transition periods. Further, the proper amounts of catalyst can be fed during catalyst transitions, which in turn may speed catalyst transitions and reduce catalyst waste.

The present techniques may be particularly useful in adjusting a catalyst feed rate during a catalyst transition period in a polymerization reactor. For example, the present techniques can be employed to calculate an overall instantaneous reaction rate for a fluidized bed, gas-phase, polymerization reactor or a loop slurry reactor. Further, in other embodiments, the present techniques may be employed to calculate reaction rates for other processes, such as autoclaves or sterilizers, among others. According to certain embodiments, a reactor system can be modeled using a continuous ideal stirred tank reactor (CISTR) model. A material balance can be performed on the reactor system using the CISTR model to determine the fractions of each type of catalyst that are present in the reactor, as well as the overall weight percent of catalyst in the reactor. A controller can then calculate the overall instantaneous reaction rate based on the respective catalyst fractions and the overall weight percent of catalyst in the reactor. Once the overall instantaneous reaction rate is determined, the catalyst feed rate can be adjusted to maintain the overall instantaneous reaction rate within the desired limits.

Figure 1:
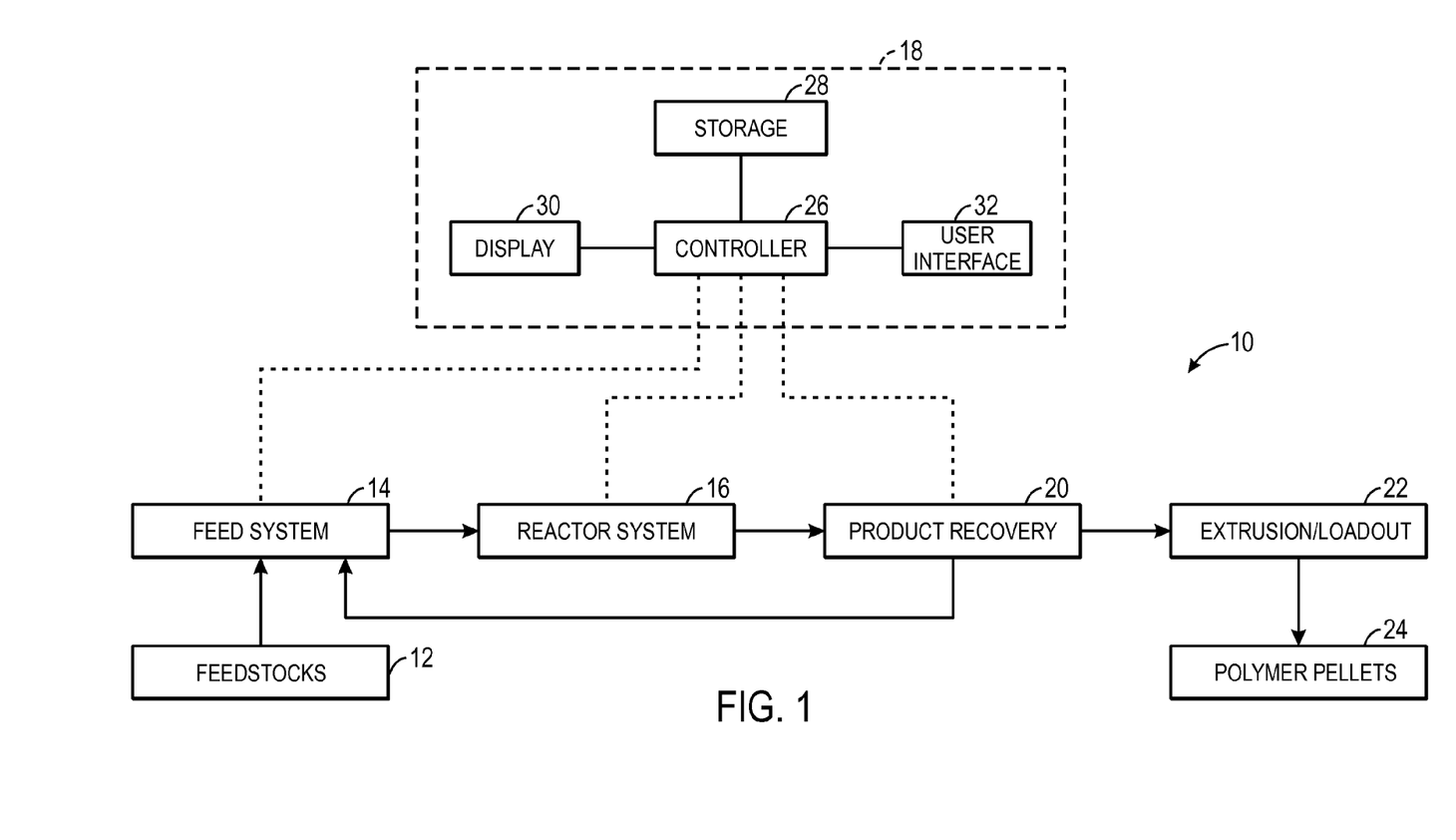
FIG. 1 is block diagram of an embodiment of a polyolefin manufacturing system with features for controlling the catalyst feed rate during catalyst transitions, in accordance with present embodiments.

FIG. 1 depicts an embodiment of a manufacturing system 10 that employs catalysts to produce a product through chemical reactions. In particular, FIG. 1 depicts a manufacturing process for producing polyolefins, such as polyethylene homopolymer, copolymer, and/or terpolymer, among others. Although the catalyst feed control techniques described herein are generally described with respect to polyolefin production, the techniques can be applied to any chemical reactor system that can be modeled using a continuous ideal stirred tank reactor model. For example, the catalyst feed control techniques can be applied to other types of polymer production, or to other processes that employ catalyst transitions, such as the production of olefins or the production of 1-hexene, among others.

The manufacturing system 10 receives feedstocks 12 for producing polyolefins through a feed system 14. For example, various suppliers may provide reactor feedstocks 12 to the feed system 14 via pipelines, trucks, cylinders, drums, and so forth. The suppliers may include off-site and/or on-site facilities, such as olefin plants, refineries, catalyst plants, and the like. Examples of possible feedstocks 12 include olefin monomers and comonomers (e.g., ethylene, propylene, butene, hexene, octene, and decene), diluents (e.g., propane, isobutane, n-hexane, and n-heptane), chain transfer agents (e.g., hydrogen), catalysts (e.g., Ziegler-Natta catalysts, chromium based catalysts, metallocene catalysts, vanadium based catalysts, nickel based catalysts, or a combination thereof, among others), co-catalysts (e.g., triethylaluminum alkyl, triethylboron, and methyl aluminoxane), and other additives.

According to certain embodiments, ethylene feedstock may be supplied by one or more pipelines at approximately 55 to 100 bar (800 to 1450 pounds per square inch gauge (psig)) at approximately 7 to 18° C. (45 to 65° F.). In another example, hydrogen feedstock may be supplied by pipeline at approximately 62 to 69 bar (900 to 1000 psig) at approximately 32 to 43° C. (90 to 110° F.). As may be appreciated, the types, combinations, and/or supply methods of the feedstocks may vary depending on factors, such as production capacity, location, design criteria, and the desired type of polyolefin product, among others.

The feedstocks 12 can be stored within the feed system 14, such as, in monomer storage and feed tanks, diluent vessels, catalyst tanks, co-catalyst cylinders and tanks, and so forth. Within the feed system 14, the feedstocks 12 also can be prepared by treatment and/or processing for entry into a reactor system 16. For example, the feedstocks 12 can be processed to produce liquid, gaseous, and/or supercritical fluid streams of monomer, comonomer, diluent, catalysts, co-catalysts, hydrogen, additives, or combinations thereof that are fed to the reactor system 16. According to certain embodiments, the feed system 14 may include treatment beds (e.g., molecular sieve beds, aluminum packing, etc.) that remove catalyst poisons from the feedstocks 12.

The feed system 14 also may prepare or condition the feedstocks 12 for addition to polymerization reactors in the reactor system 16. For example, in a loop slurry polymerization reactor system, a catalyst may be activated and then mixed with a diluent (e.g., isobutane or hexane) or mineral oil in catalyst preparation tanks. Further, the feed system 14 may meter and control the addition rate of the feedstocks 12 into the reactor system 16 to maintain the desired reactor stability and/or to achieve the desired polyolefin properties or production rate. For example, the feed system 14 may include one or more valves, such as ball check feeders or dosing valves, controlled by a control system 18 to govern the amount of catalyst added to the reactor system 16.

The reactor system 16 can include one or more polymerization reactors, such as liquid-phase reactors, gas-phase reactors, or a combination thereof. Multiple reactors may be arranged in series, in parallel, or in any other suitable combination or configuration. Within the polymerization reactors, one or more olefin monomers and/or comonomers may be polymerized to form a product containing polymer particles, typically called fluff or granules. According to certain embodiments, the olefin monomers and comonomers may include 1-olefins having up to 10 carbon atoms per molecule and typically no branching nearer the double bond than the 4-position. For example, the monomers and comonomers may include ethylene, propylene, butene, 1-pentene, 1-hexene, 1-octene, and 1-decene. The fluff may possess one or more melt, physical, rheological, and/or mechanical properties of interest, such as density, melt index (MI), melt flow rate (MFR), copolymer or comonomer content, modulus, and crystallinity. The reaction conditions, such as temperature, pressure, flow rate, mechanical agitation, product takeoff, component concentrations, polymer production rate, and so forth, may be selected to achieve the desired fluff properties.

The catalyst facilitates polymerization of the monomer within the reactor vessels. According to certain embodiments, the catalyst may include particles suspended in the fluid medium within the reactor. In general, Ziegler-Natta catalysts, chromium based catalysts, metallocene catalysts, vanadium based catalysts, nickel based catalysts, or a combination thereof, among other well-known polyolefin catalysts, as well as co-catalysts, may be used. According to certain embodiments, the catalyst may be a chromium oxide catalyst containing hexavalent chromium on a silica support.

In certain embodiments, a diluent may be employed to suspend the catalyst particles and the formed polymer particles within the reactor vessels. For example, in a loop slurry reactor, catalyst particles may be mixed with a diluent in one or more mixing tanks and/or pre-contactors to provide a catalyst slurry that is provided to the reactor. In another example, in a fluidized bed reactor, solid catalyst particles may be mixed with a liquid diluent to produce catalyst slurry that is directed into the reactor. According to certain embodiments, the diluent may be an inert hydrocarbon that is liquid at reaction conditions, such as isobutane, propane, n-butane, n-pentane, i-pentane, neopentane, n-hexane, cyclohexane, cyclopentane, methylcyclopentane, or ethylcyclohexane, among others.

Product effluent, which includes the formed polymer particles, as well as non-polymer components, such as the diluent, unreacted monomer/comonomer, and residual catalyst, exits the reactor system 16 and enters a product recovery system 20. Within the product recovery system 20, the product effluent can be processed to separate non-polymer components, such as diluent, unreacted monomer, and comonomer, from the formed polymer particles. For example, the product recovery system 20 may include one or more flash tanks, cyclones, and fractionation systems, among others, designed to separate the non-polymer components from the formed polymer particles. Further, in certain embodiments, some of the separated non-polymer components, such as diluent, may be recycled to the feed system 14.

After separation, the formed polymer particles exit the product recovery system 20 as polymer fluff that can be further processed in an extrusion/loadout system 22. In the extrusion/loadout system 22, the polymer fluff is typically extruded to produce polymer pellets 24 with the desired mechanical, physical, and melt characteristics. For example, additives, such as UV inhibitors and peroxides, may be added to the polymer fluff prior to or during extrusion to impart desired characteristics to the extruded polymer pellets 24.

In general, the polymer pellets 24 can then be transported to a product load-out area where the pellets may be stored, blended with other pellets, and/or loaded into railcars, trucks, bags, and so forth, for distribution to customers. In the case of polyethylene, the polymer pellets 24 may include low density polyethylene (LDPE), linear low density polyethylene (LLDPE), medium density polyethylene (MDPE), high density polyethylene (HDPE), and enhanced polyethylene such as bimodal grades. The various types and grades of polyethylene pellets may be marketed, for example, under the brand names Marlex® polyethylene or MarFlex® polyethylene of Chevron-Phillips Chemical Company, LP, of The Woodlands, Tex., USA.

The produced polymer (e.g., polyethylene) pellets 24 can be used in the manufacture of a variety of products, components, household items and other items, including adhesives (e.g., hot-melt adhesive applications), electrical wire and cable, agricultural films, shrink film, stretch film, food packaging films, flexible food packaging, milk containers, frozen-food packaging, trash and can liners, grocery bags, heavy-duty sacks, plastic bottles, safety equipment, coatings, toys, and an array of containers and plastic products. Further, the products and components formed from the polymer pellets 24 may be further processed and assembled prior to distribution and sale to the consumer. For example, the polymer pellets 24 are generally subjected to further processing, such as blow molding, injection molding, rotational molding, blown film, cast film, extrusion (e.g., sheet extrusion, pipe and corrugated extrusion, coating/lamination extrusion, etc.), and so on.

Regardless of the type of end product produced from the polymer pellets 24, operating conditions within the manufacturing system 10 may be controlled to produce polymer pellets 24 with the desired properties. For example, a controller 26 within the control system 18 can be employed to control operating conditions within the feed system 14, the reactor system 16, and/or the product recovery system 20. For example, the controller 26 may be employed to adjust the feed rate of monomer, comonomer, diluent, and catalyst into the reactor system 16. Further, the controller 26 may be employed to transition from feeding one type of catalyst to the reactor system 16 to feeding another type of catalyst to the reactor system 16. Moreover, the controller 26 may be employed to monitor and/or adjust operating conditions within the feed system 14, the reactor system 16, and/or the product recovery system 20, such as temperatures, pressures, the reaction rate, and the solids concentrations, among others. According to certain embodiments, the controller 26 may receive signals from sensors (such as, temperature sensors, pressure sensors, and/or flow transducers, among others) within the manufacturing system 10 that are indicative of operating conditions and may then generate control signals to adjust operating conditions of the manufacturing system 10.

According to certain embodiments, the control system 18 may be a Distributed Control System (DCS). The controller 26 may include one or more microprocessors, instruction set processors, graphics processors, analog to digital converters, interface boards, and/or related chip sets. Further, the controller 26 may cooperate with a storage 28 that stores executable code, data, and instructions for the controller 26. For example, the storage 28 may store non-transitory machine-readable code for determining the instantaneous reaction rate based on measured process variables. The storage 28 may include volatile memory, such as random access memory, and/or non-volatile memory, such as read only memory, flash memory, a hard drive, or any other suitable optical, magnetic, or solid-state computer readable media, as well as a combination thereof.

The control system 18 also includes a display 30 and a user interface 32. According to certain embodiments, the display 30 and the user interface 32 may be part of an operator workstation. The display 30 may display a variety of information about the manufacturing system 10. For example, the display 30 may display graphs, trends, mass balances, energy balances, process data, such as measured process variables, and/or predictive data, among others that facilitate user monitoring and control of the manufacturing system 10. For example, the display 30 may be employed by the controller 26 to display the solids weight percent, the monomer weight percent, the catalyst weight percent, the feed rates of some or all of the polymerization components, and the like.

According to certain embodiments, the display 30 may display screens of the user interface 32 that facilitate entry of user inputs. For example, a user may enter desired operating parameters of adjustments that should be made to the manufacturing system. In certain embodiments, a user may review an instantaneous reaction rate or trend shown on the display 30 and may enter a desired catalyst feed rate value or catalyst feed rate adjustment. In another example, a user may adjust the temperature of the reactor system 16 or one or more of the feed rates through the user interface 32. However, in other embodiments, at least some of the operating conditions may be adjusted automatically by the controller 26. For example, in certain embodiments, the controller 26 may automatically adjust the catalyst feed rate based on the determined instantaneous reaction rate.

Figure 2:
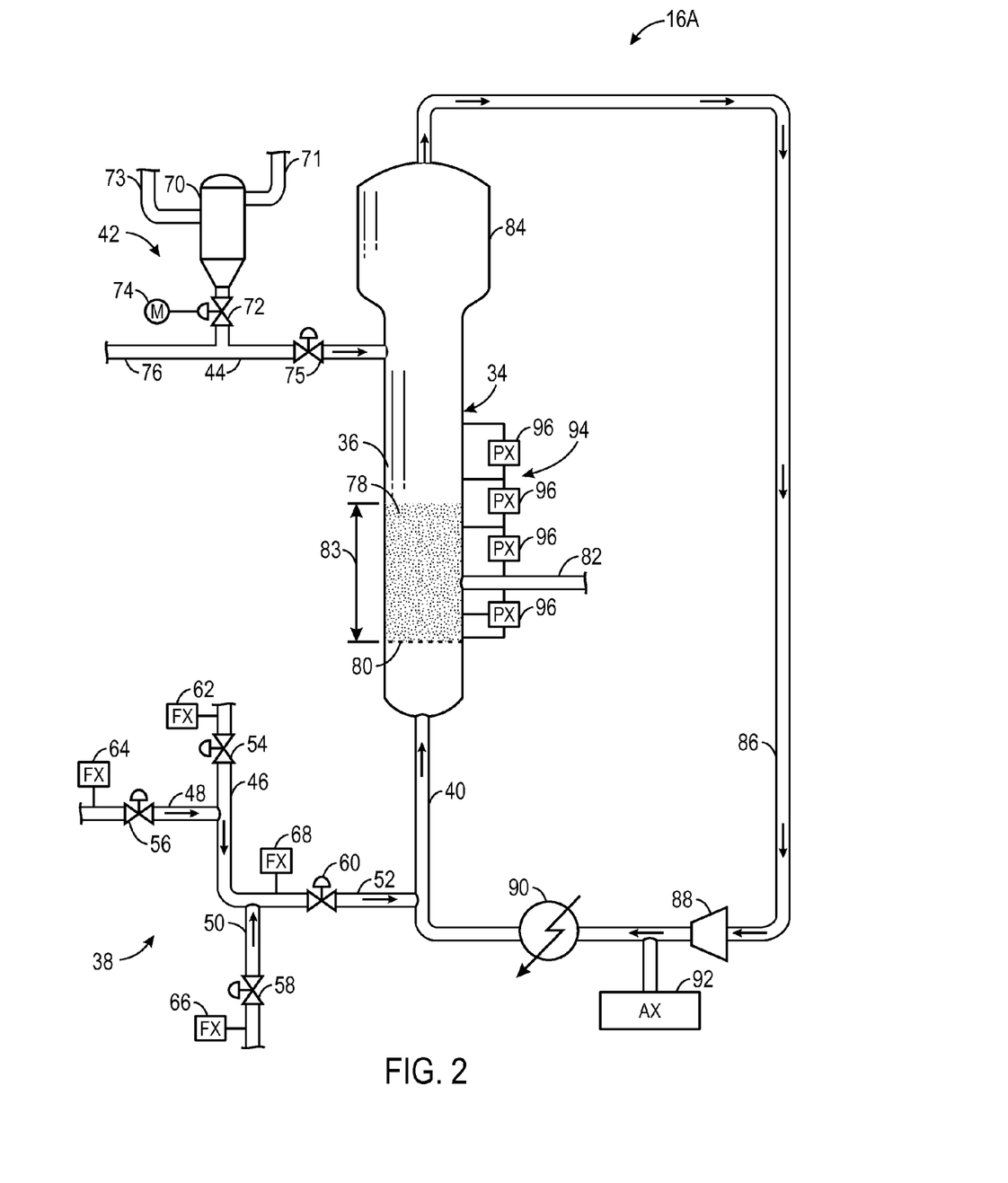
FIG. 2 is a schematic flow diagram of an embodiment of a gas-phase polymerization reactor system that may be employed in the polyolefin manufacturing system of FIG. 1, in accordance with present embodiments.
Figure 3:
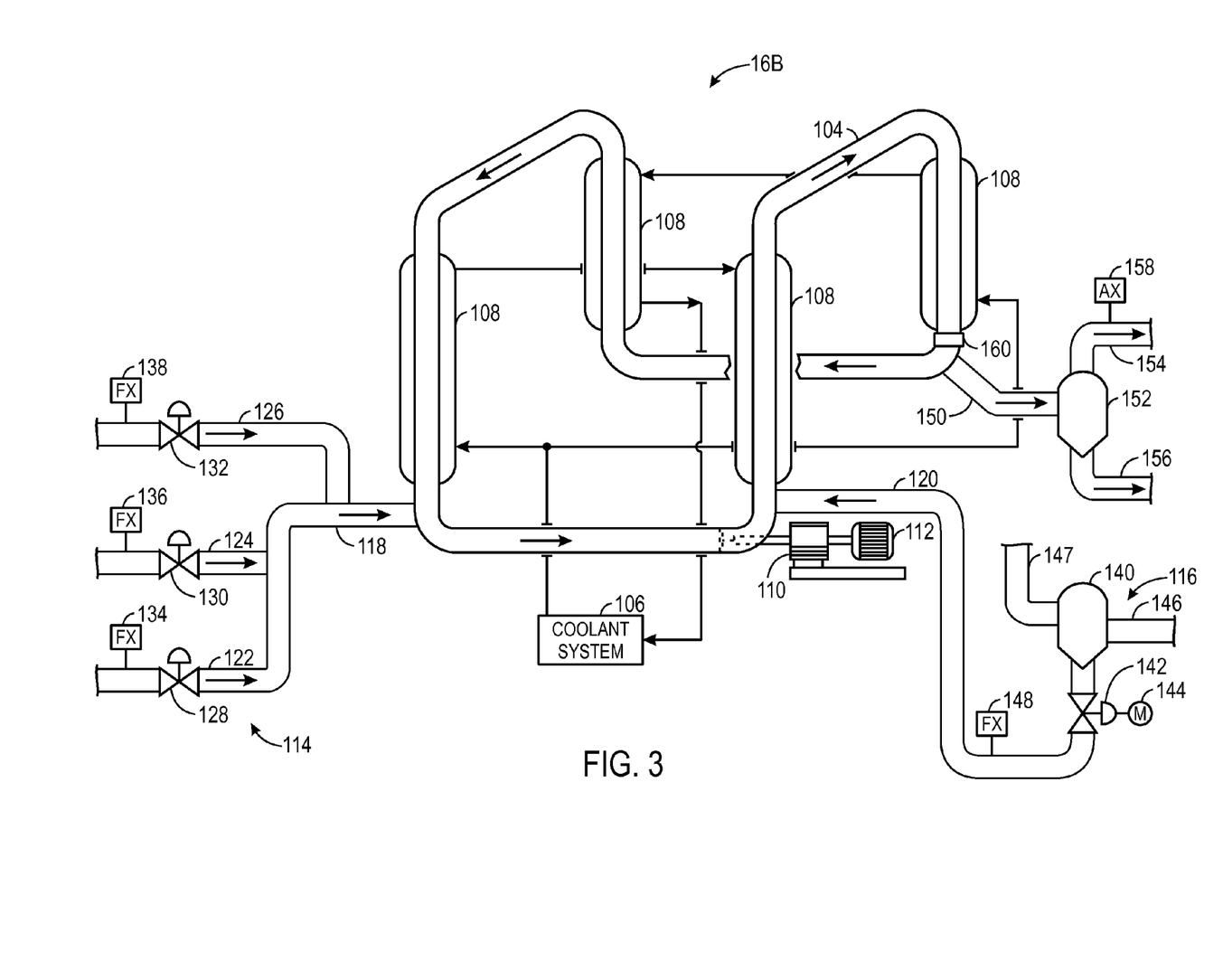
FIG. 3 is a schematic flow diagram of an embodiment of a loop slurry polymerization reactor system that may be employed in the polyolefin manufacturing system of FIG. 1, in accordance with present embodiments.

FIGS. 2 and 3 depict embodiments of reactor systems 16A and 16B that can be employed as the reactor system 16, shown in FIG. 1. In particular, FIG. 2 depicts a gas-phase fluidized bed reactor system 16A and FIG. 3 depicts a loop slurry reactor system 16B. As discussed above with respect to FIG. 1, the reactor system 16 may include one or more polymerization reactors of the same or different types. For example, the reactor system 16 may include one or more fluidized bed reactors, one or more loop slurry reactors, or a combination of fluidized bed and loop slurry reactors. Furthermore, in multiple reactor systems, the reactors may be arranged in series or in parallel. For example, in certain embodiments, two or more reactors may be connected in series to produce bimodal or multimodal resins where resins having a different average molecular weight and/or density are produced in each reactor.

To facilitate explanation, the following examples are limited in scope to specific reactor types believed to be familiar to those skilled in the art and to single reactors or simple combinations. To one of ordinary skill in the art using this disclosure, however, the present techniques are simply and easily applicable to more complex reactor arrangements, such as those involving additional reactors, different reactor types, and/or alternative ordering of the reactors or reactor types. Such arrangements are considered to be well within the scope of the present techniques.

As shown in FIG. 2, reactor system 16A includes a gas-phase, fluidized bed polymerization reactor 34 that can be employed to polymerize one or more olefins in the presence of catalyst to produce polyolefin product within a reaction zone 36. A reactant feed system 38 directs reactants, such as olefins, into the reaction zone 36 through an inlet line 40. Further, a catalyst feed system 42 directs catalyst into the reaction zone 36 through a catalyst feed line 44. Within the reaction zone 36, the catalyst and the reactants are reacted under polymerization conditions to produce polymer products. According to certain embodiments, the reactant feed system 38 and the catalyst feed system 42 may be part of the feed system 14, shown in FIG. 1.

The reactant feed system 38 includes a monomer line 46 and a comonomer line 48 that direct monomer and comonomer, respectively, into the reaction zone 36 through the inlet line 40. According to certain embodiments the monomer and comonomer may include ethylene, propylene, 1-butene, 1-hexene, 1-octene, 1-decene, or combinations thereof, among others. Further, in certain embodiments, the monomer may be ethylene, while the comonomer is 1-hexene. The reactant feed system 38 also includes an inert fluid line 50 that directs an inert fluid, such as nitrogen, into the reaction zone 36, for composition control within the reactor 34.

As shown in FIG. 2, the monomer, comonomer, and inert fluid are combined in a feed line 52 prior to entry into the reactor 34. However, in other embodiments, one or more of the monomer, comonomer and/or inert fluid, may be fed to the reactor 34 through one or more separate feed lines. Further, in certain embodiments, additional items, such as cocatalyst (e.g., organometallic compounds, such as tri-ethyl aluminum or tri-ethyl boron), catalyst modifiers (e.g., an electron donor), anti-static compounds (e.g., Stadis 450), or combinations thereof may be diluted in a suitable diluent, such as hexane, heptane, or isobutane, and fed to the reactor 34 through the reactant feed system 38 or through one or more separate feed lines.

The reactor feed system 38 also includes valves 54, 56, 58, and 60 and flow transducers 62, 64, 66, and 68, that can be used to control the flow of the monomer, comonomer, and inert fluid into the reactor 34. For example, each of the flow transducers 62, 64, 66, and 68 may be designed to measure the flow rate through the monomer line 46, the comonomer line 48, the inert fluid line 50, and the feed line 52, respectively. For example, the flow transducers 62, 64, 66, and 68 may be mass flow devices or meters. According to certain embodiments, the flow transducers 62, 64, 66, and 68 may be Coriolis flow meters, commercially available from Emerson's Micro Motion Division of Boulder, Colo. The flow transducers 62, 64, 66, and 68 may provide electrical signals indicative of the flow rate to the controller 26 (FIG. 1). The controller 26 may use the flow rate data, along with other process variables, to determine the instantaneous reaction rate, as described further below with respect to FIG. 4. Further, the controller 26 may use the flow rate data to adjust the flow rate of the feed through lines 46, 48, 50, and 52. For example, the controller 26 may generate control signals to further open and/or further close valves 54, 56, 58, and 60 to adjust the associated feed rate to the reactor 34.

The catalyst feed system 42 conveys catalyst to the reactor 34 through the catalyst feed line 44. The catalyst feed system 42 includes a catalyst hopper 70 that directs catalyst into the catalyst feed line 44 through a valve 72. An inlet line 73 may direct catalyst into the catalyst hopper 70, for example, from the feedstocks 12 (FIG. 1). According to certain embodiments, the catalyst may include solid catalyst particles that are stored within the catalyst hopper 70 under a blanket of fluid, such as nitrogen or argon, to impede exposure to oxygen. In these embodiments, an inlet line 71 may direct the fluid that blankets the catalyst into the catalyst hopper 70. According to certain embodiments, the catalyst may include a Ziegler-Natta catalyst, a chromium based catalyst, a metallocene catalyst, a vanadium based catalyst, a nickel based catalyst, or a combination thereof, among others. A traditional Ziegler-Natta catalyst typically includes a transition metal halide, such as titanium or vanadium halide, and an organometallic compound, such as tri-alkyl aluminum, that serves as an activator for the transition metal halide. The active Ziegler-Natta catalyst also may be impregnated onto an inorganic support, such as silica or alumina. The chromium based catalyst may be a chromium oxide catalyst containing hexavalent chromium on a silica support. A metallocene catalyst is typically supported on support materials, such as inorganic oxides, (e.g. silica, alumina, magnesia, or a polymeric material, such as polyethylene).

According to certain embodiments, the valve 72 is driven by a motor 74 that controls the injection rate of catalyst into the catalyst feed line 44. For example, the valve 72 may be a dosing valve that is filled with catalyst and then actuated by the motor 74 to release the catalyst into the feed line 44. The motor 74 may control the injection rate to regulate the catalyst feed rate. Further, the motor 74 may receive control signals from the controller 26 that vary the injection rate to adjust the catalyst feed rate. In certain embodiments, the amount of catalyst that enters the catalyst feed line 44 with each injection may vary. Accordingly, in certain embodiments, the controller 26 may employ a fill factor, which represents the average amount of catalyst feed per injection, in conjunction with the injection rate to calculate the catalyst feed rate. According to certain embodiments, the fill factor may be based on historical data. In certain embodiments, a valve 75 also may be disposed in catalyst feed line 44 to control the flow of the catalyst into the reactor 34. For example, in certain embodiments, the valve 75 may receive control signals from the controller 26 (FIG. 1) to further open and or further close the valve 75 to regulate the catalyst feed rate.

As the catalyst enters the catalyst feed line 44, an inert fluid (such as, nitrogen, ethane, propane, or isobutane) conveys the solid catalyst particles into the reactor through an inert fluid line 76. However, in other embodiments, a catalyst slurry may be employed, rather than a dry solid catalyst that is conveyed to the reactor 34 through an inert fluid stream. In these embodiments, the catalyst hopper 70 may contain a catalyst slurry of catalyst suspended in a liquid hydrocarbon that can be directed into the reactor 34 through the catalyst feed line 44.

Within the reaction zone 36, the catalyst and reactants form a fluidized bed 78 of solid particles, including growing polymer particles, formed polymer particles, and a minor amount of catalyst particles. The bed 78 can be fluidized by the continuous flow of gaseous components (e.g., monomer, inert fluid, cocatalyst) that enter the reactor 34 through the inlet line 40. A distributor plate 80 also is included within the reaction zone 36 to support the solid particles prior to start-up of the reactor 34, or when the reactor 34 is not operating.

The reactor 34 is generally operated at conditions suitable for polymerization. For example, the reactor 34 is typically operated at a temperature below the sintering temperature of the polymer particles to insure that sintering will not occur. According to certain embodiments, the reactor 34 may be operated at temperatures ranging from about 150° F. to about 220° F. (66° C. to 104° C.), or more specifically, from about 180° F. to about 195° F. (82° C. to 91° C.), and all subranges therebetween, depending on the physical properties of the polymer to be produced. In another example, the reactor 34 may be operated at pressures ranging from about 150 psig to about 315 psig (10 bar to 20 bar), and all subranges therebetween. Further, the operating pressures and/or temperatures may vary depending on the particular monomer chosen for the reaction. For example, for polyolefin resin production, the pressure may be as high as 1000 psig (69 bar), and more specifically, may range from about 250 psig to about 500 psig (17 bar to 34 bar).

To maintain fluidization of the bed 78, the gas flow rate through the fluidized bed 78 is typically maintained above the minimum flow rate required for fluidization. For example, the gas flow rate through the fluidized bed 78 may range from about one and a half times to about ten times the minimum fluidization flow rate, or more specifically, from about three times to about six times the minimum fluidization flow rate. According to certain embodiments, the gas flow rate may range from about 1.6 feet per second to about 2.4 feet per second, and all subranges therebetween.

The polymer particles formed within the reaction zone 36 can be withdrawn through a product line 82 as product effluent. According to certain embodiments, the polymer particles may be removed at a rate that is approximately equal to the rate of formation of the polymer particles to maintain the fluidized bed 78 at a constant height 83. Within the reaction zone 36, the unreacted gaseous components (e.g. unreacted monomer and/or comonomer) flow upward through the fluidized bed 78 to a velocity reduction zone 84. The velocity reduction zone 84 may be designed to reduce the velocity of the gaseous components to direct entrained particles back towards the fluidized bed 78. Accordingly, the velocity reduction zone 84 may inhibit the carryover of solid particles into a recycle line 86.

From the velocity reduction zone 84, the unreacted components flow through the recycle line 86, which returns the unreacted components to the reactor through the inlet line 40. The recycle line 86 includes a compressor 88 that compresses the fluid flowing through the recycle line 86, as well as a heat exchanger 90 that removes heat from the fluid flowing through the recycle line 86. According to certain embodiments, the heat exchanger 90 may be designed to remove heat produced by the exothermic reaction that occurs within the reactor 34. As shown in FIG. 2, the heat exchanger 90 is located downstream from the compressor 88. However, in other embodiments, the heat exchanger 90 may be located upstream from the compressor 88. Further, in certain embodiments, multiple heat exchangers 90 may be included within the recycle line 86 on one or both sides of the compressor 88.

The recycle line 86 returns components to the reactor 34 through the inlet line 40, which as noted above directs gaseous components into the reactor 34 to fluidize the bed 78. A high rate of recycle may be employed to achieve fluidization of the bed 78. For example, in certain embodiments, the flow rate through the recycle line 86 may be approximately at least 50 times greater than the flow rate through the feed line 52.

Further, in certain embodiments, the reactor 34 may be operated in a condensation mode where the fluid flowing through the recycle line 86 is cooled to a temperature below its dew point to form a mixture of liquid and gas. The liquid and gas may be returned to the reactor 34 through the inlet line 40. Further, in certain embodiments, a liquid separator may be located downstream of the heat exchanger 90 to separate the liquid and gas within the recycle line 86 prior to returning the liquid and gas to the reactor 34 in separate streams.

The reactor system 16A also includes measurement systems that may be employed to control and/or monitor reaction conditions within the reactor 34. For example, an analyzer 92 is disposed in the recycle line 86 to determine the composition of the recycle stream. According to certain embodiments, the analyzer 92 may be a chromatographic analyzer, mass spectrometer, or a Raman probe, among others. The analyzer 92 may be positioned in the recycle line 86 at any location between the velocity reduction zone 84 and the heat exchanger 90. However, according to certain embodiments, the analyzer 92 may be disposed in the recycle line 86 between the compressor 88 and the heat exchanger 90. According to certain embodiments, the analyzer 92 may transmit signals indicative of the composition of the recycle stream to the controller 26 (FIG. 1). The controller 26 may then use the composition data to calculate the instantaneous reaction rate, as well as other reactor operating conditions.

The reactor system 16A also includes a differential pressure measurement system 94 that can be employed to measure the differential pressure across the height 83 of the fluidized bed 78. In particular, the differential pressure measurement system 94 includes several differential pressure sensors 96 disposed in the reactor 34 to measure the differential pressure across various regions of the reaction zone 36. According to certain embodiments, the differential pressure measurement system 94 may transmit signals indicative of differential pressure values to the controller 26 (FIG. 1). The controller 26 may then use the differential pressure values to determine the instantaneous reaction rate.

FIG. 3 depicts another embodiment of a reactor system 16B that can be employed in the manufacturing system 10 of FIG. 1. The reactor system 16B includes a loop slurry reactor 104 that can be employed to polymerize one or more olefins in the presence of catalyst to produce polyolefin product. The loop slurry reactor 104 is generally composed of segments of pipe connected by smooth bends or elbows. As shown, the loop slurry reactor 104 includes four vertical pipe legs formed integrally with horizontal pipe legs (or curved connecting members). According to certain embodiments, the pipe legs may be approximately 24 inches in diameter and approximately 200 feet in length, connected by pipe elbows at the top and bottom of the legs. However, in other embodiments, the diameter, length, and number and/or types of legs may vary. For example, in other embodiments, the loop slurry reactor 104 may include as many as eight to sixteen vertical pipe legs. Further, in other embodiments, more than sixteen vertical pipe legs may be included. In another example, the horizontal members may be eliminated while the vertical legs are connected through curved connecting members. Further, in another example, the pipe legs may be arranged horizontally without vertical pipe legs.

The reactor system 16B includes a coolant system 106 that circulates a cooling fluid, such as treated water, through reactor jackets 108. The coolant system 106 may be designed to remove heat from the exothermic polymerization that occurs within the reactor 104. According to certain embodiments, the coolant system 106 may be designed to maintain the temperature of the reactor 104 at a temperature below that at which the polymer product would go into solution and/or start to melt. For example, in certain embodiments where polyethylene is produced, the coolant system 106 may be designed to maintain the reactor temperature between approximately 150° F. to 250° F. (65° C. to 121° C.). Moreover, the coolant system 106 can be communicatively coupled to the controller 26 (FIG. 1) to provide data representing process variables of the coolant system 106 to the controller 26. For example, in certain embodiments, the controller 26 may use data from the coolant system 106 to perform an energy balance on the coolant system 106, which in turn may be used to determine the instantaneous reaction rate, as described further below with respect to FIG. 4.

In general, the loop slurry reactor 104 can be used to carry out polyolefin polymerization under slurry conditions in which insoluble particles of polyolefin are formed in a fluid medium and are suspended as slurry within the loop slurry reactor 104. A motive device, such as pump 110, circulates the fluid slurry in the reactor 104. According to certain embodiments, the pump 110 may be an in-line axial flow pump with a pump impeller disposed within the interior of the loop slurry reactor 104 to propel the fluid medium through the closed loop of the reactor, at sufficient speed to keep solid particulates, such as the catalyst and the polyolefin product, suspended within the fluid medium. For example, in a loop slurry reactor producing polyethylene, an average circulation rate of approximately 30 to 45 feet/second is typically sufficient to maintain the suspension of polymer product and catalyst as slurry. The impeller can be driven by a motor 112 or other motive force.

The fluid medium is supplied to the loop slurry reactor 104 by a reactant feed system 114 and a catalyst feed system 116. According to certain embodiments, the reactant feed system 114 and the catalyst feed system 116 may be part of the feed system 14, shown in FIG. 1. The reactant feed system 114 and the catalyst feed system 116 each include an inlet line 118 and 120 that direct the reactants and the catalyst, respectively, into the reactor 104. Further, in other embodiments multiple inlet lines 118 and/or 120 may be included to direct the reactants and/or catalyst into the reactor 104.

The reactant feed system 114 includes a monomer line 122 and a comonomer line 124 that direct monomer and comonomer, respectively, into the reactor 104 through the inlet line 118. According to certain embodiments the monomer and comonomer may include ethylene, propylene, 1-butene, 1-hexene, 1-octene, 1-decene, or a combinations thereof, among others. The reactant feed system 114 also includes a diluent line 126 that directs diluent into the reactor 104 to suspend the catalyst particles and the formed polymer particles within the reactor 104. According to certain embodiments, the diluent may be isobutane, propane, n-butane, n-pentane, i-pentane, neopentane, n-hexane, cyclohexane, cyclopentane, methylcyclopentane, or ethylcyclohexane, among others.

As shown in FIG. 3, the monomer, comonomer, and diluent are combined in the inlet line 118 prior to entry into the reactor 104. However, in other embodiments, one or more of the monomer, comonomer and/or diluent, may be fed to the reactor 104 through one or more separate feed lines. Further, in certain embodiments, additional items, such as cocatalysts (e.g., alkyl aluminum compounds, triethylboron, methyl aluminoxane, etc.), molecular weight control agents (e.g., hydrogen), and any other desired co-reactants or additives may be directed to the reactor 104 through the reactant feed system 114.

The reactant feed system 114 also includes valves 128, 130, and 132 and flow transducers 134, 136, and 138 that can be used to control the flow of the monomer, comonomer, and diluent into the reactor 104. Each of the flow transducers 134, 136, and 138 may be designed to measure the flow rate through the monomer line 128, the comonomer line 130, and the diluent line 132, respectively. For example, the flow transducers 134, 136, and 138 may be mass flow devices or meters. According to certain embodiments, the flow transducers 134, 136, and 138 may be Coriolis flow meters. The flow transducers 134, 136, and 138 may provide signals indicative of the flow rate to the controller 26 (FIG. 1). The controller 26 may then use the flow rate data, along with other process variables, to determine the instantaneous reaction rate, as described further below with respect to FIG. 4. Further, the controller 26 may use the flow rate data to adjust the flow rate of the feed through lines 122, 124, and 126. For example, the controller 26 may generate control signals to further open and/or further close valves 128, 130, and 132 to adjust the feed rate to the reactor 104.

The catalyst feed system 116 conveys catalyst to the reactor 104 through the catalyst feed line 120. According to certain embodiments, the catalyst may include chromium oxide on a silica support, such as silica-alumina, silica-titania, and silica-alumina-titania. The catalyst also may include a Ziegler-Natta catalyst, a metallocene catalyst, a vanadium based catalyst, a nickel based catalyst, or a combination thereof, among others. The catalyst feed system 116 includes a catalyst chamber 140 that directs a mixture of catalyst and diluent into the catalyst feed line 120 through a valve 142. For example, a diluent line 146 may direct diluent into the catalyst chamber 140 to create the catalyst mixture. According to certain embodiments, the diluent may be recycled to the catalyst chamber 140 from the product recovery system 20 (FIG. 1). However, in other embodiments, the diluent line 146 may supply fresh diluent to the catalyst chamber 140. An inlet line 147 may direct catalyst into the catalyst chamber 140, for example, from the feedstocks 12 (FIG. 1).

According to certain embodiments, the catalyst chamber 140 may be a mud chamber that directs a catalyst mud into the catalyst feed line 120 through the valve 142. Within the catalyst mud chamber 140, dry, solid catalyst is combined with monomer-free diluent to form a catalyst mud. The catalyst mud is fed to the catalyst feed line 120 by the valve 142, which is driven by a motor 144 that controls the injection rate of catalyst into the catalyst feed line 120. According to certain embodiments, the valve 142 may be a ball check feeder or a shot feeder. For example, the valve 142 may include a rotary cup that is filled with catalyst mud and then rotated 180° to release the catalyst mud into the catalyst feed line 120. The motor 144 may control the rotational speed and/or rotational frequency of the valve 142 to regulate the injection rate of catalyst into the catalyst feed line 120. Further, the motor 144 may receive control signals from the controller 26 that vary the injection rate to adjust the catalyst feed rate. In embodiments, the controller 26 may employ a fill factor in conjunction with the injection rate to calculate the catalyst feed rate. Further, according to certain embodiments, the fill factor may be based on historical data.

In other embodiments, the catalyst chamber 140 may include one or mix tanks that agitate solid catalyst with diluent to produce catalyst slurry. In these embodiments, the catalyst chamber 140 may contain a slurry of catalyst suspended in liquid diluent that can be directed into the reactor 104 through the catalyst feed line 120.

The catalyst feed system 116 may further include a flow transducer 148 designed to measure the flow rate through the catalyst feed line 120. For example, the flow transducer 148 may be a mass flow device or meter. According to certain embodiments, the flow transducer 148 may be a Coriolis flow meter. The flow transducer 148 may provide signals indicative of the flow rate to the controller 26 (FIG. 1). The controller 26 may then use the flow rate data, along with other process variables, to determine the instantaneous reaction rate, as described further below with respect to FIG. 4. Further, the controller 26 may use the flow rate data to adjust the feed rate of catalyst to the reactor 104. For example, the controller 26 may generate control signals to further open and/or further close valve 142 to adjust the feed rate to the reactor 104.

Within the reactor 104, the catalyst facilitates the polymerization of the monomer and/or comonomer to form polymer particles. The reactor 104 is generally operated at conditions suitable for polymerization. Further, the reaction conditions, such as temperature, pressure, and reactant concentrations, are regulated to facilitate the desired properties and production rate of the polymer in the reactor, to control stability of the reactor, and the like. The temperature is typically maintained below the level at which the polymer product would go into solution, swell, soften, or become sticky. As discussed above, the coolant system 106 may circulate cooling fluid through the reactor jackets 108 to regulate the reactor temperature. The pressure also may be regulated within a desired pressure range, such as 7 to 55 bar (100 to 800 psig), with a range of 31 to 48 bar (450 to 700 psig) being typical.

As the polymerization reaction proceeds within the reactor 104, the monomer and comonomer polymerize to form polymer particles that are substantially insoluble in the fluid medium at the reaction temperature, thereby forming slurry containing solid particles within the fluid medium. These solid polymer particles can be removed from the reactor 104 as product effluent via one or more removal lines 150, such as settling legs, continuous take-offs, or other suitable withdrawal systems.

From the reactor 104, the product effluent is directed to a flash tank 152. According to certain embodiments, the flash tank 152 may be part of the product recovery system 20 (FIG. 1). Further, in certain embodiments, the product effluent may be directed through an in-line flash heater prior to entering the flash tank 152. Within the flash tank 152, at least a portion of the diluent may vaporize and/or separate from the polymer particles and be withdrawn through a vapor removal line 154. The fluid exiting through the vapor removal line 154 may contain primarily diluent, as well as unreacted monomer and/or comonomer. The fluid from the vapor removal line 154 may then undergo further processing within the product recovery system 20 (FIG. 1) to remove entrained polymer particles.

The majority of the solid particles within the flash tank 152 may exit the flash tank 152 through a product removal line 156 as a solids discharge. The solids discharge from the product removal line 156 may then undergo further processing within the product recovery system 20 (FIG. 1) to separate polymer particles from non-polymer components. For example, the solids discharge may be directed through one or more rotary or cycling valves and/or fluff chambers to a purge column designed to remove residual hydrocarbons from the solids discharge.

The reactor system 16B also includes measurement systems that may be employed to control and/or monitor reaction conditions within the reactor 104. For example, an analyzer 158 is disposed in the vapor removal line 154 to determine the composition of the fluid exiting through the vapor removal line 154. According to certain embodiments, the analyzer 158 may be a chromatographic analyzer, mass spectrometer, or a Raman probe, among others. According to certain embodiments, the analyzer 158 may transmit signals indicative of the composition of the fluid within the vapor removal line 154 to the controller 26 (FIG. 1). The controller 26 may then use the composition data to calculate the instantaneous reaction rate, as well as other reactor operating conditions. For example, in certain embodiments, the data from the analyzer 158 may be used to calculate the concentration of reactants, such as unreacted monomer and/or comonomer, within the fluid exiting through the vapor removal line 154.

The reactor system 16B also includes a probe 160 that can be employed to determine the solids concentration within the reactor 104. According to certain embodiments, the probe 160 may be a Raman probe that employs Raman spectroscopy. However, in other embodiments, the probe 160 may be another type of probe, such as a probe that uses conductivity and/or light scattering to measure the solids concentration and/or slurry density. According to certain embodiments, the probe 160 may transmit signals indicative of the solids concentration to the controller 26 (FIG. 1). The controller 26 may then use the solids concentration data to calculate the instantaneous reaction rate, as described further below with respect to FIG. 4. As shown in FIG. 3, the probe 160 is located within the reactor 104 just upstream from the product removal line 150. However, in other embodiments, the probe 160 may be located at other locations within the reactor or within the product removal line 150.

By keeping reaction conditions, such as temperature, pressure, percent by weight solids, and percent by volume solids, among others within the desired ranges and by using a suitable polymerization catalyst, the polymer produced by the reactor 104 may have the desired properties. As discussed above, controlling the instantaneous reaction rate may facilitate the production of polymer with the desired properties. However, during catalyst transitions, process variables are continuously changing, and accordingly, it can be difficult to determine the instantaneous reaction rate. Therefore, it may be desirable to determine the instantaneous reaction rate using real-time measured process variables, material balances, and calculations to provide an instantaneous reaction rate in approximately real time and/or without significant delay. The catalyst feed rate can then be adjusted based on the determined instantaneous reaction rate to maintain the instantaneous reaction rate within desired limits during a catalyst transition period. As noted above, maintaining the instantaneous reaction rate within the desired limits minimizes off-spec product during catalyst transition periods, speeds catalyst transitions, and reduces catalyst waste.

Figure 4:
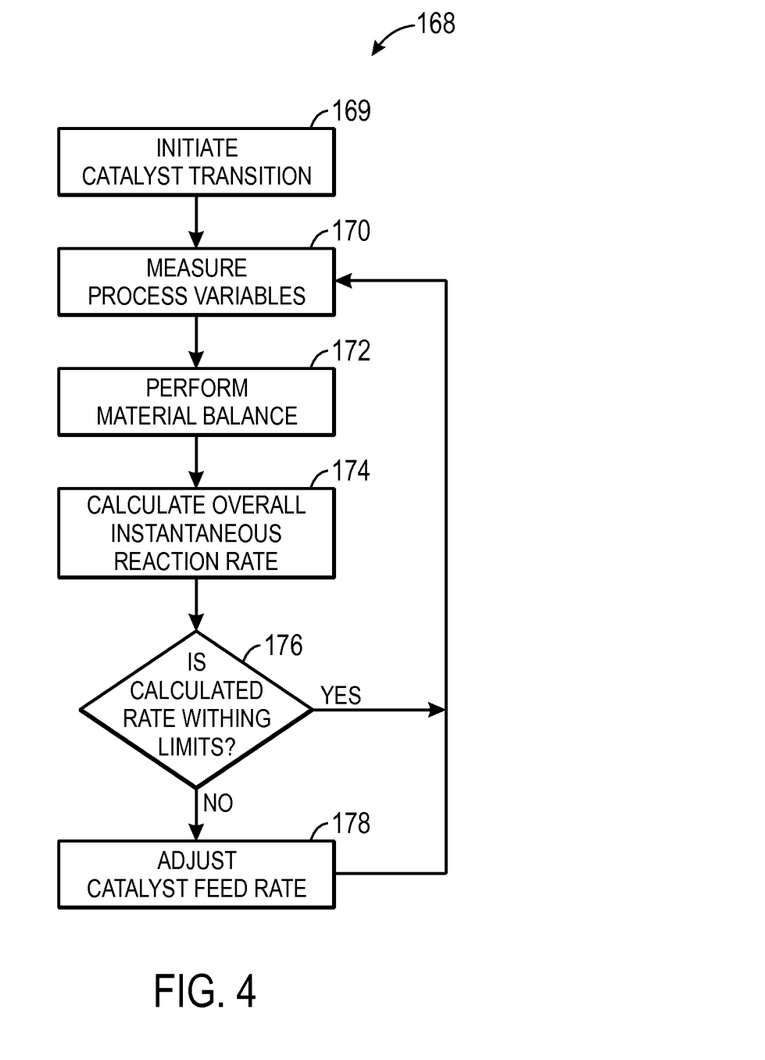
FIG. 4 is a flow chart depicting a method for controlling catalyst feed rate during a catalyst transition, in accordance with present embodiments.

FIG. 4 depicts a method 168 for maintaining the instantaneous reaction rate within desired limits during a catalyst transition. The method 168 may facilitate real-time, or near real-time determination of the instantaneous reaction rate, as well responsive adjustment of the catalyst feed rate. The method 168 may begin by initiating (block 169) a catalyst transition. For example, as shown in FIG. 1, the controller 26 may switch the feed system 14 from directing a first type of catalyst to the reactor system 16 to directing a second type of catalyst to the reactor system 16. According to certain embodiments, the controller 26 may initiate the catalyst transition in response to a user input received through the user interface 32 and/or in response to measured process variables.

When initiating a catalyst transition, the controller 26 may direct the feed system 14 to stop feeding the first type of catalyst, and then begin feeding the second type of catalyst to the reactor system 16. For example, in a fluidized bed reactor system 16A (FIG. 2) the controller 26 may send control signals to the feed system 14 to stop directing the first type of catalyst into the catalyst hopper 70 through the inlet line 73.

The controller 26 may then send control signals to the feed system 14 to begin directing the second type of catalyst into the catalyst hopper 70 through the inlet line 73. In certain embodiments, the controller 26 may wait until the catalyst hopper 70 is empty to instruct the feed system to direct the second type of catalyst into the catalyst hopper 70. Further, in other embodiments, the first catalyst and the second catalyst may be directed into the catalyst hopper 70 through separate inlet lines. Moreover, in other embodiments, the feed system 14 may include multiple catalyst hoppers. In these embodiments, a separate catalyst hopper may be used for each catalyst.

In a loop slurry reactor system 16B, the controller 26 may direct the feed system 14 the controller 26 may send control signals to the feed system 14 to stop directing the first type of catalyst into the catalyst chamber 140 through the inlet line 147. The controller 26 may then send control signals to the feed system 14 to begin directing the second type of catalyst into the catalyst chamber 140 through the inlet line 147. According to certain embodiments, the controller 26 may wait until the first type of catalyst has substantially exited the catalyst chamber 140 to instruct the feed system 14 to direct the second type of catalyst into the catalyst chamber 140. Further, in other embodiments, the first catalyst and the second catalyst may be directed into the catalyst chamber 140 through separate inlet lines. Moreover, in other embodiments, the feed system 14 may include multiple catalyst chambers. In these embodiments, a separate catalyst chamber may be used for each type of catalyst.

The method 168 may then continue by measuring (block 170) process variables. For example, the controller 26 (FIG. 1) may receive signals representing conditions, such as temperature, pressure, solids concentration, and flow rate, among others, from sensors and/or flow transducers included within the fluidized bed reactor 34, shown in FIG. 2, or the loop slurry reactor 104, shown in FIG. 3. The measured process variables can then be employed in a material balance and/or calculations to determine the instantaneous reaction rate. According to certain embodiments, the process variables may be measured frequently, for example, every 1, 5, 10, 20, 30, or 60 seconds.

The controller 26 then performs (block 172) a differential material balance on the catalyst within the polymerization reactor. In particular, the controller 26 may execute one or more hardware and/or software algorithms to perform the material balance and determine the fraction of the first type of catalyst within the reactor, the fraction of the second type of catalyst within the reactor, and the overall total weight fraction of catalyst in the reactor.

The overall material balance on the catalyst can be described as:

$$\frac{dM_c}{dt} = m_{cf} - m_{co} \tag{1}$$

where $$\frac{dM_c}{dt}$$

is the change in the reactor catalyst inventory over time; $m_{cf}$ is the total feed rate of the catalyst entering the reactor; and $m_{co}$ is the effluent rate of catalyst exiting the reactor. As shown by Equation 1, the overall material balance employs a continuous ideal stirred tank reactor model by assuming that the composition of material exiting the reactor is approximately equal to the composition of material within the reactor. In other words, the overall material balance assumes that the reactor contents are well mixed to provide a generally homogeneous mixture, such that the composition within the reactor is nearly identical to the composition exiting the reactor.

Because the catalyst exits the reactor as part of the product, the effluent rate of catalyst exiting the reactor can be expressed as:

$$m_{co} = w_e m_{po} \tag{2}$$

where $w_e$ is the weight fraction of total catalyst in the reactor, and also in the product exiting the reactor; and $m_{po}$ is the effluent rate of product exiting the reactor. For example, in the case of a polymerization reactor, $m_{po}$ represents the effluent rate of polymer product exiting the reactor.

The reactor catalyst inventory can be expressed as:

$$M_c = w_e M_b \tag{3}$$

where $M_c$ is the total reactor catalyst inventory; and $M_b$ is the solids weight within the reactor. Accordingly, by substituting Equations 2 and 3 into the overall material balance, Equation 1 becomes:

$$\frac{d[w_e M_b]}{dt} = m_{cf} - w_e m_{po} \tag{4}$$

Equation 4 represents the change in the total catalyst inventory in the reactor over time. During catalyst transitions, the reactor contains both the initial catalyst (the first catalyst) that was fed to the reactor, as well as the new catalyst (the second catalyst) that is currently being fed to the reactor. Accordingly, Equation 4 can be modified to express the change in the first catalyst inventory in the reactor over time as:

$$\frac{d[f_i w_e M_b]}{dt} = [m_{cf}]_i - f_i w_e m_{po} \tag{5}$$

where $f_i$ is the weight fraction of the first catalyst in the reactor; and $[m_{cf}]_i$ is the feed rate of the first catalyst entering the reactor.

Equation 4 also can be modified to express the change in the second catalyst inventory over time as:

$$\frac{d[f_j w_e M_b]}{dt} = [m_{cf}]_j - f_j w_e m_{po} \tag{6}$$

where $f_j$ is the weight fraction of the second catalyst in the reactor; and $[m_{cf}]_j$ is the feed rate of the second catalyst entering the reactor. Further, the total of the first and second catalyst fractions can be expressed as:

$$1 = f_i + f_j \tag{7}$$

Equations 5, 6, and 7 can then be solved for the three unknown variables: the weight fraction of total catalyst in the reactor ($w_e$), the weight fraction of the first catalyst in the reactor ($f_i$) and the weight fraction of the second catalyst in the reactor ($f_j$). For example, the controller 26 (FIG. 1) may employ one or more hardware and/or software algorithms to solve Equations 5, 6, and 7 for the three unknown variables.

The remaining variables in Equation 5, 6, and 7 can be determined by measured process variables and/or calculations. For example, the solids weight ($M_b$) within the reactor can be calculated using one or more measured process variables. In a fluidized bed reactor, the solids weight can be calculated based on data received from the differential pressure measurement system 94, as shown in FIG. 2. For example, the controller 26 may use data received from the differential pressure measurement system 94 to determine the differential pressure over the height 83 of the fluidized bed 78. The solids weight, as represented by the weight of the fluidized bed 78, can then be calculated by multiplying the differential pressure over the fluidized bed height by the cross-sectional area of the reaction zone 36. According to certain embodiments, the controller 26 may retrieve the cross-sectional area of the reaction zone 36 from the storage 28 (FIG. 1). Further, in other embodiments, the cross-sectional area of the reaction zone 36 may be input by an operator through the user interface 32.

In a loop slurry reactor, the solids weight within the reactor can be calculated based on data received from the probe 160, as shown in FIG. 3. For example, the controller 26 may use data received from the probe 160 to determine the solids concentration within the reactor 104. According to certain embodiments, the probe 160 may provide slurry density data that can be employed to determine the solids concentration within the reactor 104. The solids weight, as represented by the solids inventory within the reactor, can then be calculated by multiplying the solids concentration by the volume of the reactor 104. According to certain embodiments, the controller 26 may retrieve the reactor volume from the storage 28 (FIG. 1). Further, in other embodiments, the reactor volume may be input by an operator through the user interface 32.

The catalyst feed rates ($[m_{cf}]_i$ and $\lfloor m_{cf} \rfloor_j$) also can be determined by measured process variables and/or calculations. As noted above, during a catalyst transition, the feed of the first type of catalyst is stopped and replaced by a feed of the second type of catalyst. Accordingly, during a catalyst transition, none of the first type of catalyst is fed to the reactor, and therefore, the feed rate of the first catalyst is zero. In certain embodiments, the feed rate of the second catalyst can be measured by a flow transducer. For example, in a loop slurry reactor that feeds a catalyst slurry to the reactor, a flow transducer 148 (FIG. 3) can be employed to measure the second catalyst feed rate and provide signals representative of the feed rate to the controller 26.

However, in other embodiments, the second catalyst feed rate may be calculated using the catalyst injection rate. For example, as shown in FIG. 2, in a fluidized bed reactor that employs a solid catalyst directed to the reactor 34 using an inert fluid, the valve 72 can be actuated to inject catalyst into the catalyst feed line 44. The rate of injection can be controlled by the motor 74, which actuates the valve 72. For example, the controller 26 (FIG. 1) may transmit control signals to the motor 74 to specify the catalyst injection rate. The specified catalyst injection rate can then be used to calculate the catalyst feed rate as shown below in Equation 8.

$$m_{cf} = FI \qquad (8)$$

As shown in Equation 8, I represents the catalyst injection rate; and F represents the fill factor. As discussed above with respect to FIG. 2, the fill factor represents the amount of catalyst that is supplied to the reactor in each injection. According to certain embodiments, the fill factor may be determined using historical fill factor data that is stored within the storage 28 (FIG. 1). Further, in certain embodiments, the fill factor may be input by an operator through the user interface 28 (FIG. 1). The controller 26 may then use the fill factor data and the catalyst injection rate to calculate the feed rate of the second catalyst.

The effluent rate of product exiting the reactor ($m_{po}$) also can be determined by measured process variables and/or calculations. For example, in certain embodiments, the effluent rate of product exiting the reactor may be approximated using the monomer feed rate. In these embodiments, the monomer feed rate may be measured, and then used as the product effluent rate. For example, in the fluidized bed reactor system 16A (FIG. 2), the flow transducer 62 may measure the monomer feed rate and provide the monomer feed rate to the controller 26 (FIG. 1). In the loop slurry reactor system 16B (FIG. 3), the flow transducer 134 may measure the monomer feed rate and provide the monomer feed rate to the controller 26.

In other embodiments, the product effluent rate can be determined by performing an energy balance. In particular, in the loop slurry reactor system 16B, the product effluent rate can be determined by performing an energy balance around the coolant system 106. For example, the energy balance may be performed by monitoring the response of the coolant system 106 to compensate for the heat generated by the reaction within the reactor 104. For example, if during the course of polymerization, the reactor 104 experiences an increase in heat production, the coolant system 106 may increase the flow of cooling fluid through the reactor jackets 108 to compensate for this increase. The increased influx of cooling fluid may be proportional to the increase in temperature, and the increase in temperature may be proportional to an increase in polymer production (polymerization facilitated by the catalyst). Thus, using these relationships, it may be possible to calculate the real-time product effluent rate. In the fluidized bed reactor system 16A, the product effluent rate can be determined by performing an energy balance using data from the heat exchanger 90. For example, parameters, such as temperature or flow rate, of the cooling fluid flowing through the heat exchanger 90 can be measured and used to determine the product effluent rate.

In other embodiments, rather than determining the product effluent rate by using the monomer feed rate or by using an energy balance around the coolant system, the product effluent rate may be determined as part of the material balance. In these embodiments, four equations may be employed to solve for the four unknowns: the weight fraction of total catalyst in the reactor ($w_e$), the weight fraction of the first catalyst in the reactor ($f_i$), the weight fraction of the second catalyst in the reactor ($f_j$), and the product effluent rate ($m_{po}$). Equations 5, 6, and 7 can be employed as the first three equations in conjunction with the fourth equation (Equation 9) that is shown below.

$$V_f \frac{dc_m}{dt} = m_{mf} - \left[1 + \frac{\varepsilon c_m}{(1-\varepsilon)\rho_p}\right] m_{po} \qquad (9)$$

Equation 9 represents a material balance for reactants (e.g., monomer) within the reactor, where $V_f$ is the volume of the fluid phase in the reactor;

$$\frac{dc_m}{dt}$$

is the change in the concentration of monomer in the fluid phase in the reactor over time; $m_{mf}$ is the monomer feed rate;

ε is volume fraction of the fluid phase in the reactor; $c_m$ is the concentration of monomer in the fluid phase in the reactor; and $\rho_p$ is the density of the polymer product in the effluent exiting the reactor. With the exception of the product effluent rate ($m_{po}$), which is solved for in the material balance, the remaining variables can be measured and/or calculated.

For example, the volume of the fluid phase in the reactor ($V_f$) can be calculated by subtracting the volume of the solids in the reactor from the total reactor volume. In the fluidized bed reactor system 16A shown in FIG. 2, the volume of the solids in the reactor can be determined using data received from the differential pressure measurement system 94. Further, in the loop slurry reactor system 16B shown in FIG. 3, the volume of the solids in the reactor can be determined using data received from the probe 160. According to certain embodiments, the total reactor volume may be stored within the storage 28 (FIG. 1). Further, in certain embodiments, the total reactor volume may be input by an operator through the user interface 28 (FIG. 1). The controller 26 may then use the total reactor volume and the volume of solids to calculate the volume of the fluid phase in the reactor. The controller 26 also may calculate the volume fraction of the fluid phase in the reactor (ε) based on the volumes of the solid phase and the fluid phase in the reactor.

The concentration of monomer in the fluid phase in the reactor ($c_m$) can be calculated using one or more process variables. In a fluidized bed reactor, the concentration of monomer in the fluid phase can be calculated based on data received from the analyzer 92, as shown in FIG. 2. For example, the controller 26 may use data received from the analyzer 92 to determine the composition of the reactor fluid, as well as the fluid density. The reactor fluid composition and density may then be used by the controller 26 to calculate the concentration of monomer in the fluid phase. In a loop slurry reactor, the concentration of monomer in the fluid phase can be calculated based on data received from the probe 160, as shown in FIG. 3. For example, the controller 26 may use data received from the probe 160 to determine the fluid composition and density in the reactor 104, which can then be used by the controller 26 to calculate the concentration of monomer in the fluid phase.

As discussed above, the monomer feed rate $m_{mf}$ can be measured using a flow transducer. For example, in the fluidized bed reactor system 16A (FIG. 2), the flow transducer 62 may measure the monomer feed rate and provide the monomer feed rate to the controller 26 (FIG. 1). In the loop slurry reactor system 16B (FIG. 3), the flow transducer 134 may measure the monomer feed rate and provide the monomer feed rate to the controller 26. The polymer product density ($\rho_p$) can be determined based on historical and/or theoretical data. For example, the polymer product density may depend upon the grade of product being produced. In certain embodiments, the controller 26 may retrieve the polymer product density from the storage 28 (FIG. 1), or the polymer product density may be input by a user through the user interface 32 (FIG. 1).

Once the measured and/or calculated variables in the material balance equations have been determined, the material balance equations can be solved to determine the weight fraction of total catalyst in the reactor ($w_e$), the weight fraction of the first catalyst in the reactor ($f_i$), and the weight fraction of the second catalyst in the reactor ($f_j$). These values can then be employed by the controller 26 to calculate (block 174) the overall instantaneous reaction rate. According to certain embodiments, the controller 26 may execute one or more hardware and/or software algorithms, look up tables, or the like, to calculate the overall instantaneous reaction rate.

The overall instantaneous reaction rate may be expressed as:

$$m_{pr} = k M_c C_m \qquad (10)$$

where $m_{pr}$ is the overall instantaneous reaction rate; k is the overall reaction rate constant; $M_c$ is the reactor catalyst inventory; and $C_m$ is the concentration of monomer in the reactor. The overall reaction rate constant (k) can be calculated as follows:

$$k = f_i k_i + f_j k_j \qquad (11)$$

where $k_i$ is the reaction rate constant for the first catalyst; and $k_j$ is the reaction rate constant for the second catalyst. According to certain embodiments, the controller 26 (FIG. 1) may retrieve the reaction rate constants from the storage 28 (FIG. 1). For example, the reaction rate constants may be contained in one or more look up tables stored within the storage 28.

The reactor catalyst inventory ($M_c$) can be calculated as follows:

$$M_c = w_e M_b \qquad (12)$$

where $w_e$ is the weight fraction of total catalyst in the reactor, as determined by the material balance; and $M_b$ is the weight of solids in the reactor, as discussed above with respect to Equations 5 and 6.

The concentration of monomer in the reactor ($C_m$) can be determined using one or more measured variables. In the fluidized bed reactor system 16 (FIG. 2), the monomer concentration can be determined using data received from the analyzer 92. For example, the concentration of monomer may be determined using the monomer partial pressure measured by the analyzer 92. In the loop slurry reactor system 16B shown in FIG. 3, the monomer concentration can be determined using data received from the analyzer 158, which also may measure the monomer partial pressure.

Once the monomer concentration ($C_m$), the reactor catalyst inventory ($M_c$), and the overall reaction rate constant (k) have been determined, the controller 26 may calculate the overall instantaneous reaction rate ($m_{pr}$), as discussed above with respect to Equation 10. According to certain embodiments, the overall instantaneous reaction rate may be representative of real-time, or near real-time conditions (e.g., such as within 1, 5, 10, or 30 to 120 seconds) in the reactor. Therefore, the controller 26 may repeatedly perform (block 172) the material balance and calculate (block 174) the overall instantaneous reaction rate in step-wise time increments. For example, the controller 26 may perform the material balance and calculate the overall instantaneous reaction rate every 1, 5, 10, or 30 to 120 seconds.

The controller 26 may then determine (block 176) whether the overall instantaneous reaction rate is within the desired limits. For example, the controller 26 may compare the calculated overall instantaneous reaction rate to limits stored within the storage 28 (FIG. 1). Further, in certain embodiments, the controller 26 also may determine whether a rate of change and/or trend in the overall instantaneous reaction rate is within limits. Moreover, the controller 26 may use the calculated overall instantaneous reaction rate to predict future overall instantaneous reaction rates.

If the overall instantaneous reaction rate is within the desired limits and/or trends, the controller 26 may again measure (block 170) the process variables, and the method 168 may begin again. On the other hand, if the overall instantaneous reaction rate is outside of the desired limits and/or trends, the controller 26 may adjust (block 178) the feed rate of the second catalyst to maintain the overall instantaneous reaction rate within the desired range and/or return the overall instantaneous reaction rate to the desired range. For example, in the fluidized bed reactor system 16A (FIG. 2), the controller 26 may transmit control signals to the motor 74 and/or the valve 75 to adjust the catalyst feed rate. In the loop slurry reactor system 16B (FIG. 3), the controller may transmit control signals to the motor 144 to adjust the catalyst feed rate. After adjusting the catalyst feed rate, the controller 26 may again measure (block 170) process variables, and the method 168 may begin again.

According to certain embodiments, the method 168 may be performed for the duration of a catalyst transition period. For example, a catalyst transition may take approximately 7 to 15 hours, and all subranges therebetween, for a fluidized bed reactor 34, as shown in FIG. 2. In another example, a catalyst transition may take approximately 1 to 10 hours, and all subranges therebetween, for a loop slurry reactor 104, as shown in FIG. 3. According to certain embodiments, the entire method 168 may be performed by the controller 26. However, in other embodiments, a portion of the method may be performed by a user through the user interface 32 (FIG. 1). For example, in certain embodiments, the overall instantaneous reaction rate may be displayed on the display 30, allowing a user to determine (block 176) whether the overall instantaneous reaction rate is within the desired limits. Further, in certain embodiments, a user may enter inputs through the user interface 32 that may be employed by the controller 26 to adjust (block 178) the catalyst feed rate.

ADDITIONAL DESCRIPTION

Systems and methods for operating a reactor during a catalyst transition period have been described. The following embodiments are offered as further description of the present disclosure.

Embodiment 1

A method of operating a reactor during a catalyst transition period, the method comprising: feeding a first catalyst and a second catalyst to the reactor during the catalyst transition period; producing product effluent during the catalyst transition period; determining respective fractions of the first catalyst and the second catalyst in the reactor by performing a material balance on the reactor, based at least on a flow rate of the product effluent exiting the reactor; calculating an overall instantaneous reaction rate based on the respective fractions; and adjusting a feed rate for the second catalyst based on the overall instantaneous reaction rate.

Embodiment 2

The method of embodiment 1, wherein performing a material balance comprises performing a differential material balance for a total amount of the first catalyst and the second catalyst within the reactor and assuming a first material composition exiting the reactor is approximately equal to a second material composition within the reactor.

Embodiment 3

The method defined in any preceding embodiment, wherein performing a material balance comprises calculating the feed rate for the second catalyst using historical fill factor data for the second catalyst.

Embodiment 4

The method defined in any preceding embodiment, wherein performing a material balance comprises measuring the feed rate for the second catalyst.

Embodiment 5

The method defined in any preceding embodiment, wherein performing a material balance comprises calculating a fraction of total catalyst in the reactor with respect to total reactor contents, a fraction of the first catalyst in the reactor with respect to total reactor catalyst content, and a fraction of the second catalyst in the reactor with respect to the total reactor catalyst content.

Embodiment 6

The method defined in any preceding embodiment, comprising: feeding a monomer to the reactor at a monomer feed rate; feeding the first catalyst to the reactor at a first catalyst feed rate; transitioning from feeding the first catalyst to the polymerization reactor system to feeding the second catalyst to the polymerization reactor system at a second catalyst feed rate; and polymerizing a portion of the monomer on the first catalyst and polymerizing a portion of the monomer on the second catalyst within the polymerization reactor system to form the product effluent, wherein the product effluent comprises polymer particles.

Embodiment 7

The method defined in any preceding embodiment, wherein the reactor comprises a fluidized bed reactor.

Embodiment 8

The method defined in any preceding embodiment, wherein the reactor comprises a loop slurry reactor.

Embodiment 9

The method defined in any preceding embodiment, comprising an additional reactor disposed in series with the reactor.

Embodiment 10

The method defined in any one of embodiments 6 to 9, wherein transitioning from feeding the first catalyst to the reactor to feeding the second catalyst to the reactor comprises stopping feeding of the first catalyst to the polymerization reactor system and starting feeding of the second catalyst to the polymerization reactor system.

Embodiment 11

The method defined in any preceding embodiment, wherein performing a material balance comprises solving the following equations for $f_i$, $f_j$, and $w_e$:

$$\frac{d[f_i w_e M_b]}{dt} = [m_{cf}]_i - f_i w_e m_{po}$$

$$\frac{d[f_j w_e M_b]}{dt} = [m_{cf}]_j - f_j w_e m_{po}$$

$$1 = f_i + f_j$$

wherein $f_i$ is a weight fraction of the first catalyst in the reactor; $f_j$ is a weight fraction of the second catalyst in the reactor; $w_e$ is a weight fraction of total catalyst in the reactor; $M_b$ is a weight of solids in the polymerization reactor system; $[m_{cf}]_i$ is the first catalyst feed rate; $[m_{cf}]_j$ is the second catalyst feed rate; $m_{po}$ is the effluent rate of the polymer particles exiting the reactor;

$$\frac{d[f_i w_e M_b]}{dt}$$

is a change in an amount of the first catalyst in the reactor over a time period; and $$\frac{d[f_j w_e M_b]}{dt}$$

is a change in an amount of the second catalyst in the reactor over the time period.

Embodiment 12

The method defined in any preceding embodiment, comprising measuring a monomer feed rate using a mass flow device, wherein the monomer feed rate is used to determine an effluent rate of polymer particles exiting the reactor.

Embodiment 13

The method defined in any preceding embodiment, wherein the material balance is performed using a control system configured to calculate the second catalyst feed rate by multiplying a catalyst injection rate for the second catalyst by a historical valve fill factor for the second catalyst.

Embodiment 14

The method defined in any preceding embodiment, comprising measuring a solids concentration in the polymerization reactor system and measuring a flash gas monomer concentration, wherein the solids concentration is used to determine the weight of solids in the polymerization reactor system, and wherein the flash gas monomer concentration is used to determine the overall instantaneous reaction rate.

Embodiment 15

A polymerization reactor system, comprising: a reactor configured to polymerize monomer into polymer solids; a monomer feed system configured to feed the monomer to the reactor; a catalyst feed system configured to feed a first catalyst and a second catalyst to the reactor; and a control system configured to perform a material balance on the reactor to determine respective fractions of the first catalyst and the second catalyst in the reactor during a catalyst transition period, and configured to determine an overall instantaneous reaction rate based on the respective fractions, wherein the material balance is based at least on an effluent rate of the polymer solids exiting the reactor.

Embodiment 16

The system or method defined in any preceding embodiment, comprising a control system for performing the material balance, wherein the control system comprises a workstation configured to display the overall instantaneous reaction rate, and wherein the control system is configured to receive a user input that adjusts a feed rate for the second catalyst based on the overall instantaneous reaction rate.

Embodiment 17

The system or method defined in any preceding embodiment, comprising a control system for performing the material balance, wherein the control system is configured to adjust a feed rate for the second catalyst based on the overall instantaneous reaction rate.

Embodiment 18

The system or method defined in any preceding embodiment, comprising a control system for performing the material balance, and comprising differential pressure detectors disposed in the reactor to measure a pressure differential across a fluidized bed of the reactor, wherein the control system is configured to receive the pressure differential and to calculate a weight of the fluidized bed based on the pressure differential, and wherein the control system is configured to employ the weight of the fluidized bed in the material balance.

Embodiment 19

The system or method defined in any one of embodiments 6 to 18, comprising a control system for performing the material balance, a recycle line configured to recycle unreacted monomer exiting a velocity reduction zone of the reactor back into the reactor, and a gas chromatograph disposed in a recycle line to measure a partial pressure of the monomer, wherein the control system is configured receive the partial pressure and to calculate the overall instantaneous reaction rate based on the partial pressure.

Embodiment 20

The system or method defined in any one of embodiments 6 to 18, comprising a control system for performing the material balance, and comprising a flow meter disposed in a monomer feed system to measure a monomer feed rate, wherein the control system is configured to receive the monomer feed rate and to employ the monomer feed rate in the material balance.

While the present disclosure may be susceptible to various modifications and alternative forms, specific embodiments have been shown by way of example in the drawings and tables and have been described in detail herein. However, it should be understood that the embodiments are not intended to be limited to the particular forms disclosed. Rather, the disclosure is to cover all modifications, equivalents, and alternatives falling within the spirit and scope of the disclosure as defined by the following appended claims. Further, although individual embodiments are discussed herein, the disclosure is intended to cover all combinations of these embodiments.

What is claimed is:

1. A reactor system, comprising:
a reactor configured to polymerize monomer into polymer solids;
a monomer feed system configured to feed the monomer to the reactor;
a catalyst feed system configured to feed a first catalyst and a second catalyst to the reactor; and
a control system configured to perform a material balance on the reactor to determine respective fractions of the first catalyst and the second catalyst in the reactor during a catalyst transition period, and configured to determine an overall instantaneous reaction rate based on the respective fractions, wherein the material balance is based at least on an effluent rate of the polymer solids exiting the reactor.

2. The reactor system of claim 1, wherein the control system comprises a workstation configured to display the overall instantaneous reaction rate, and wherein the control system is configured to receive a user input that adjusts a feed rate for the second catalyst based on the overall instantaneous reaction rate.

3. The reactor system of claim 1, wherein the control system is configured to adjust a feed rate for the second catalyst based on the overall instantaneous reaction rate.

4. The reactor system of claim 1, comprising differential pressure detectors disposed in the reactor to measure a pressure differential across a fluidized bed of the reactor, wherein the control system is configured to receive the pressure differential and to calculate a weight of the fluidized bed based on the pressure differential, and wherein the control system is configured to employ the weight of the fluidized bed in the material balance.

5. The reactor system of claim 1, comprising:
a recycle line configured to recycle unreacted monomer exiting a velocity reduction zone of the reactor back into the reactor; and
a gas chromatograph disposed in the recycle line to measure a partial pressure of the monomer, wherein the control system is configured receive the partial pressure and to calculate the overall instantaneous reaction rate based on the partial pressure.

6. The reactor system of claim 1, comprising a flow meter disposed in the monomer feed system to measure a monomer feed rate, wherein the control system is configured to receive the monomer feed rate and to employ the monomer feed rate in the material balance.

7. A reactor system, comprising:
a reactor configured to receive monomer, a first catalyst, and a second catalyst, and configured to polymerize the monomer into polymer solids in the presence of the first catalyst and the second catalyst; and
a control system configured to perform a material balance on the reactor to determine respective fractions of the first catalyst and the second catalyst in the reactor, and configured to determine an overall instantaneous reaction rate based on the respective fractions of the first catalyst and the second catalyst in the reactor, wherein the material balance is based at least on a rate of the polymer solids exiting the reactor.

8. The reactor system of claim 7, wherein the control system is configured to adjust a feed rate for the second catalyst based on the overall instantaneous reaction rate.

9. The reactor system of claim 7, wherein the control system comprises a workstation configured to display the overall instantaneous reaction rate, and wherein the control system is configured to receive a user input that adjusts a feed rate for the second catalyst based on the overall instantaneous reaction rate.

10. The reactor system of claim 7, wherein the reactor comprises a fluidized bed reactor, a loop slurry reactor, or any combination thereof.

11. The reactor system of claim 7, comprising:
a monomer feed line configured to feed into a lower portion of the reactor; and
a catalyst feed line configured to feed into an upper portion of the reactor.

12. The reactor system of claim 7, comprising differential pressure detectors disposed in the reactor to measure a pressure differential across a fluidized bed of the reactor, wherein the control system is configured to receive the pressure differential and to calculate a weight of the fluidized bed based on the pressure differential, and wherein the control system is configured to employ the weight of the fluidized bed in the material balance.

13. The reactor system of claim 7, comprising a probe disposed in the reactor to measure a solids concentration within the reactor, wherein the control system is configured to receive the solids concentration and to calculate a solids weight within the reactor, and wherein the control system is configured to employ the solids weight within the reactor in the material balance.

14. The reactor system of claim 7, comprising:
a recycle line configured to recycle unreacted monomer exiting a velocity reduction zone of the reactor back into the reactor; and
a gas chromatograph disposed in the recycle line to measure a partial pressure of the monomer, wherein the control system is configured receive the partial pressure and to calculate the overall instantaneous reaction rate based on the partial pressure.

15. The reactor system of claim 7, comprising:
a flash tank configured to vaporize unreacted monomer through a vapor removal line; and
an analyzer disposed in the vapor removal line to measure a partial pressure of the monomer, wherein the control system is configured receive the partial pressure and to calculate the overall instantaneous reaction rate based on the partial pressure.

16. A system, comprising:
a control system for a reactor system, the control system comprising:
one or more tangible, non-transitory, machine-readable media collectively storing one or more sets of instructions; and
one or more processors including circuitry configured to execute the one or more sets of instructions to control operations of the reactor system to:
feed a first catalyst and a second catalyst to a reactor of the reactor system during a catalyst transition period to facilitate production of product effluent during the catalyst transition period;
determine respective fractions of the first catalyst and the second catalyst in the reactor by performing a material balance on the reactor, based at least on a flow rate of the product effluent exiting the reactor;
calculate an overall instantaneous reaction rate based on the respective fractions of the first catalyst and the second catalyst; and
adjust a second catalyst feed rate based on the overall instantaneous reaction rate.

17. The system of claim 16, wherein performing the material balance comprises performing a differential material balance for a total amount of the first catalyst and the second catalyst within the reactor and assuming a first material composition exiting the reactor is approximately equal to a second material composition within the reactor.

18. The system of claim 16, wherein the one or more processors is configured to execute the one or more sets of instructions to control operations of the reactor system to:
feed a monomer to the reactor at a monomer feed rate;
feed the first catalyst to the reactor at a first catalyst feed rate;
transition from feeding the first catalyst to the reactor to feeding the second catalyst to the reactor at the second catalyst feed rate during the catalyst transition period; and
facilitate polymerization of a first portion of the monomer on the first catalyst and polymerization of a second portion of the monomer on the second catalyst within the reactor to form the product effluent, wherein the product effluent comprises polymer particles.

19. The system of claim 18, wherein performing the material balance comprises solving the following equations for $f_i$, $f_j$, and $w_e$:

$$\frac{d[f_i w_e M_b]}{dt} = [m_{cf}]_i - f_i w_e m_{po}$$

$$\frac{d[f_j w_e M_b]}{dt} = [m_{cf}]_j - f_j w_e m_{po}$$

$$1 = f_i + f_j$$

wherein $f_i$ is a weight fraction of the first catalyst in the reactor; $f_j$ is a weight fraction of the second catalyst in the reactor; $w_e$ is a weight fraction of total catalyst in the reactor; $M_b$ is a weight of solids in the reactor; $[m_{cf}]_i$ is the first catalyst feed rate; $[m_{cf}]_j$ is the second catalyst feed rate; $m_{po}$ is a rate of the polymer particles exiting the reactor;

$$\frac{d[f_i w_e M_b]}{dt}$$

is a change in an amount of the first catalyst in the reactor over a time period; and $$\frac{d[f_j w_e M_b]}{dt}$$

is a change in an amount of the second catalyst in the reactor over the time period.

20. The system of claim 19, wherein the control system is configured to measure a solids concentration in the reactor and measure a monomer concentration, wherein the solids concentration is used to determine the weight of solids in the reactor, and wherein the monomer concentration is used to determine the overall instantaneous reaction rate.

* * * * *